No. 780,386. PATENTED JAN. 17, 1905.
G. W. THOMPSON.
ELECTROMAGNETIC TRACTION DEVICE.
APPLICATION FILED JULY 26, 1904.
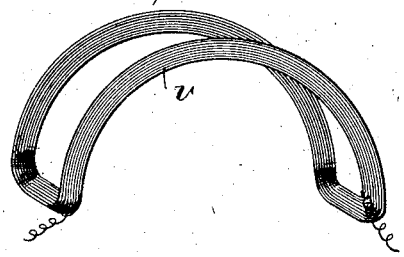
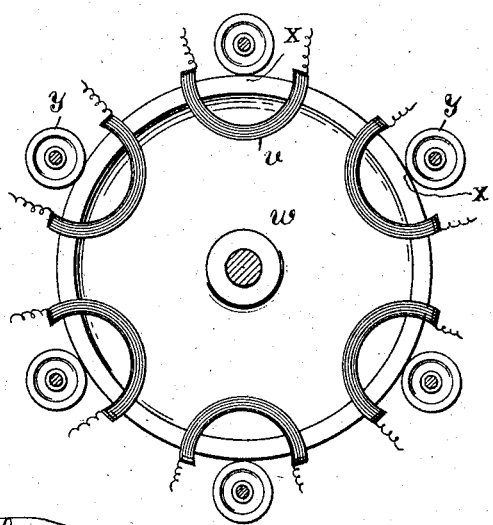
WITNESSES:
INVENTOR
George W. Thompson
BY Munn & Co
ATTORNEYS No. 780,386. Patented January 17, 1905.

UNITED STATES PATENT OFFICE.

GEORGE W. THOMPSON, OF MELROSE, MASSACHUSETTS.

ELECTROMAGNETIC TRACTION DEVICE.

SPECIFICATION forming part of Letters Patent No. 780,386, dated January 17, 1905.

Application filed July 26, 1904. Serial No. 218,202.

*To all whom it may concern:*

Be it known that I, GEORGE W. THOMPSON, a citizen of the United States, and a resident of Melrose, in the county of Middlesex and State of Massachusetts, have invented a new and Improved Electromagnetic Traction Device, of which the following is a full, clear, and exact description.

My invention relates to electromagnetic traction devices, and more particularly to means for insuring the communication of rotation between two or more revoluble members of iron or other ferruginous material having their treads in contact and to insure the communication of rotation between one revoluble member and a number of other revoluble members placed symmetrically around the first one and so disposed that their treads are in contact with the tread of said first-mentioned revoluble member.

In its simplest form my invention consists of means for producing a magnetic pull at a point upon the periphery of a wheel of ferruginous material at the place of contact between said wheel and another wheel engaged thereby. I seek to give the magnetic pole its greatest intensity at the point where the contact takes place between the wheels.

Reference is to be had to the accompanying drawings, forming a part of this specification, in which similar characters of reference indicate corresponding parts in the figures.

Figure 1 shows a solenoid having substantially the conformity of a semiring, and Fig. 2 is a side elevation showing a central wheel geared magnetically with a number of smaller wheels disposed radially around the same and energized by solenoids of the form indicated in Fig. 1.

As shown in Fig. 1, the wire is coiled into the form of a solenoid $v$, having substantially the form of a semiring and disposed about the wheel $w$, as indicated. The wheel $w$ is of iron, steel, or other ferruginous material, and the tread or rim of the wheel $w$ engages the tread or rim of a wheel $y$, also of ferruginous material. The relation of these parts is such that when the solenoid $v$ is "dead" there is no great friction between the wheels $w$ and $y$. When, however, the solenoid $v$ is energized by means of an electric current, a magnetic pole $x$ is formed which produces opposite polarity in the adjacent surface of the wheel $y$, and the wheels $w$ and $y$ cling together with considerable power as long as the solenoid $v$ remains energized. If now one of the wheels be caused to rotate while the solenoid is energized, the other wheel is driven in like manner as if it were geared positively thereto. Where several solenoids $v$ are employed, as indicated in Fig. 2, they may be connected in series or in parallel or in any desired manner known to the art. Each wheel $w$ forms as many poles $x$ as there are solenoids, each pole producing opposite polarity in the surface of the wheel $y$ immediately adjacent thereto. The result is that the wheel $w$ may communicate motion to any or all of the wheels $y$, depending upon whether or not the solenoids $v$ are energized.

As shown in the drawings, the concave side of the solenoid $v$ is toward the point of contact of the wheel $w$ with the wheel $y$. By this construction and arrangement the solenoid incloses more of the wheel $w$ diametrically than would a straight solenoid and at the same time the magnetization of the wheel is concentrated on a smaller portion of the wheel circumferentially, thus making a much stronger magnet at the point of contact. This curved form of solenoid is applicable only to wheels in contact and can be used to the best advantage when the wheels in contact differ greatly in size diametrically.

My invention is of peculiar value in any machine where the desired change in speed rotation is greatest on account of economy of space and the absence of added friction upon the bearings—for instance, as when belts are used.

My invention may be used as a gearing where the rates of speed are very high, and is noiseless and continuous in action even when the rates of speed are moderate and the load variable. A smooth uniform rolling motion is communicated by means of the arrangement above described. There is no back thrust on the bearings, so as to increase the friction, and these conditions hold good no matter how high a speed may be attained.

While I preferably employ a solenoid because it would more readily encircle a part of a wheel or wheels, I do not limit myself thereto, as magnetic members of other kinds may sometimes be employed to advantage without departing from the spirit of my invention.

Having thus described my invention, I claim as new and desire to secure by Letters Patent—

1. The combination of a plurality of revoluble gear members made of ferruginous material and engaging each other, and a magnetic member having substantially the form of a semiring and partially inclosing one of said gear members, the concave side of the magnetic member being toward the point of contact of the gear members.

2. The combination of a revoluble wheel, a solenoid having the form of a semiring and partially inclosing said wheel, and a wheel in contact with the first wheel at a point between the ends of the solenoid, the concave side of the solenoid facing the point of contact of the wheels.

3. The combination of a revoluble wheel of ferruginous material, a smaller wheel of similar material engaging the first wheel, and a curved magnetic member inclosing a portion of the periphery and sides of the first wheel, the concave side of the magnetic member facing toward the point of contact of the said wheels.

4. The combination of a revoluble wheel of ferruginous material, a series of smaller wheels of similar material spaced from each other and engaging the periphery of the first-mentioned wheel and a series of solenoids, each inclosing a portion of the periphery and sides of the first-mentioned wheel the said solenoids being substantially semiring-shaped and each having its concave side facing the point of engagement of said first-mentioned wheel with one of said smaller wheels.

In testimony whereof I have signed my name to this specification in the presence of two subscribing witnesses.

GEORGE W. THOMPSON.

Witnesses:
GEORGE L. COBURN,
J. WALTER NEWHALL.